United States Patent
Urala

[11] Patent Number: 5,604,773
[45] Date of Patent: Feb. 18, 1997

[54] DESYNCHRONIZER AND METHOD FOR SUPPRESSING POINTER JITTER IN A DESYNCHRONIZER

[75] Inventor: Reino Urala, Helsinki, Finland

[73] Assignee: Nokia Telecommunications OY, Espoo, Finland

[21] Appl. No.: 284,551
[22] PCT Filed: Feb. 12, 1993
[86] PCT No.: PCT/FI93/00046
  § 371 Date: Oct. 6, 1994
  § 102(e) Date: Oct. 6, 1994
[87] PCT Pub. No.: WO93/16536
  PCT Pub. Date: Aug. 19, 1993

[30] Foreign Application Priority Data
Feb. 14, 1992 [FI] Finland ................................ 920644

[51] Int. Cl.$^6$ .............................. H04L 7/00; H04L 23/00
[52] U.S. Cl. ........................ 375/372; 375/376; 370/516
[58] Field of Search ................................. 375/371, 372, 375/376; 370/102, 108, 105.3

[56] References Cited

U.S. PATENT DOCUMENTS

| 4,095,053 | 6/1978 | Duttweiler et al. | 370/102 |
| 4,811,340 | 3/1989 | McEachern et al. | 370/102 |
| 4,996,698 | 2/1991 | Nelson . | |
| 5,052,025 | 9/1991 | Duff et al. . | |
| 5,268,935 | 12/1993 | Mediavilla et al. | 375/371 |
| 5,457,717 | 10/1995 | Bellamy | 375/372 |

FOREIGN PATENT DOCUMENTS

| 197492 | 10/1986 | European Pat. Off. . |
| 491054 | 1/1992 | European Pat. Off. . |
| 4014800 | 11/1991 | Germany . |

Primary Examiner—Wellington Chin
Assistant Examiner—Paul Loomis
Attorney, Agent, or Firm—Cushman Darby & Cushman IP Group of Pillsbury Madison & Sutro LLP

[57] ABSTRACT

A method for suppressing pointer phase jitter in a desynchronizer including a data buffer means; a write address counter controlled by a write clock; a read address counter controlled by a read clock; and a phase-locked loop for phase-locking the read clock to the write clock. The method includes modulating the pointer phase jitter to a frequency substantially higher than the bandwidth of the phase-locked loop.

8 Claims, 3 Drawing Sheets

DESYNCHRONIZER AND METHOD FOR SUPPRESSING POINTER JITTER IN A DESYNCHRONIZER

FIELD OF THE INVENTION

The invention relates to a method for suppressing pointer phase jitter in a desynchronizer comprising a data buffer means; a data buffer write address counter controlled by a write clock; a data buffer read address counter controlled by a read clock; and a phase-locked loop for phase-locking the read clock to the write clock.

BACKGROUND OF THE INVENTION

The CCITT recommendations G.707, G.708 and G.709 specify a synchronous digital hierarchy SDH, which enables the multiplexing of the signals of existing PCM systems, such as 2, 8, 34 and 140 Mbit/s, into a synchronous frame of 155 Mbit/s called STM-1 (synchronous transfer module). The structure of the STM-1 frame is illustrated in FIG. 1. The frame is usually shown as a unit comprising nine lines each having 270 bytes. The first nine bytes on each line contain a section overhead and AU pointer bytes. The remaining portion of the transfer frame STM-1 contains one or more administration units AU. In this specific case, there is an administration unit AU-4 of the highest level, in which a virtual container VC-4 similarly of the highest level is placed, and e.g. a 139264 kbit/s plesiochronous information signal can be mapped directly in the virtual container VC-4. Alternatively, the transfer frame STM-1 may contain several lower-level administration units AU in each one of which a corresponding virtual container VC of the lowest level is placed. In FIG. 1, the VC-4 comprises a 1-byte path overhead POH and a 240-byte information bit group at the start of both of which a special control byte is placed. Some of the control bytes are used, e.g. for performing interface justification in connection with mapping when the rate of the information signal to be mapped deviates to some extent from its nominal value. Mapping of the information signal into the transfer frame STM-1 is described, e.g. in the patent applications AU-B-34639/89 and FI-914746.

Each byte in the unit AU-4 has a position number. The above-mentioned AU pointer contains the position of the first byte of the container VC-4 in the unit AU-4. In addition, by means of the pointers, so-called positive or negative pointer justifications can be performed at the different locations of the SDH network. If a VC having a certain clock frequency is applied to a network node operating at a clock frequency lower than the above-mentioned clock frequency of the VC, the data buffer will be filled up. This requires negative justification: one byte is transferred from the received VC into the overhead section, while the pointer value is decreased by one.

If the rate of the received VC is lower than the clock rate of the node, the data buffer tends to be emptied, which calls for positive justification in which a stuff byte is added to the VC and the pointer value is incremented by one.

Bit justification (interface justification) used in mapping as well as pointer justification cause phase jitter, which should be compensated for by the desynchronizer on leaving the SDH network. Phase jitter and its compensation are described, e.g. in *Simulation Results and Field Trial Experience of Justification Jitter*, Ralph Urbansky, 6th World Telecommunication Forum, Geneva, Oct. 10–15 1991, International Telecommunication Union, Part 2, Vol III, p. 45 to 49.

For this purpose, the prior art desynchronizers comprise a data buffer with an associated analog phase-locked loop (PLL) which phase-locks the read clock of the data buffer to the write clock. As the PLL operates in the same way as a lowpass filter, it removes jitter except for jitter components of the lowest frequency. For instance, the pointer justification of the SDH typically generates much more intensive jitter components than bit justification as individual phase discontinuities in the pointer justification are e.g. 8 or 24 frame intervals UI and as the frequency of occurrence of phase discontinuities induced by pointer justifications may represent a very low frequency difficult to filter in the PLL of the desynchronizer. Adequate suppression of pointer jitter by filtering would require that the bandwidth of the loop should be very low (the absolute value depends on the rate of the interface). FIGS. 2 and 3 show how the jitter peaks induced by two pointer justifications of 24 UI (measured from the output of the desynchronizer through a measuring filter specified by the CCITT) can be reduced to an acceptable maximum level of about 0.2 UI by drastic filtering when the bandwidth of the PLL at e.g. 140 Mbit/s is about 2 Hz. However, no pointer justifications are needed in normal operation, and only bit justifications are active. Accordingly, the dimensioning of the phase-locked loop of the desynchronizer on the basis of pointer justifications is unreasonable as the bandwidth of the PLL could be even ten times higher from the viewpoint of bit justification. The locking of the PLL would thereby also be more reliable and the locking time would be substantially shorter.

One prior art solution to the problem is bit leaking, in which pointer induced phase discontinuities are removed by a non-linear process (in the time domain), whereby incoming data bits are processed by a separate serial buffer so that the phase of the write clock and data applied to the buffer of the desynchronizer is advanced (or retarded) periodically, and so a stepwise phase shift is converted into a linear phase shift taking place over a longer period of time. The pointer justifications are thereby processed separately by a bit leaking buffer so that the bandwidth of the phase-locked loop of the desynchronizer itself can be increased so as to meet the requirements of the bit justifications. A problem with bit leaking is the bit-level serial data processing and the relatively complicated logic. It is further to be noted that it is not adequate that one pointer at a time can be processed but, in the worst case, the logic should be able to operate with tens of overlapping pointer justifications at different decay stages. Therefore, the use of this technique in a high-rate 140 Mbit/s desynchronizer is not advisable due to the increased power consumption, for instance.

SUMMARY OF THE INVENTION

The object of the invention is to provide a simple and economical arrangement for suppressing pointer jitter peaks, which is also suitable for the rate of 140 Mbit/s and even higher rates.

This is achieved by means of a method according to the invention, comprising modulating the phase jitter induced by the pointer justifications occurring in the input signal of the desynchronizer to a frequency substantially higher than the bandwidth of the phase-locked loop.

As mentioned above, the frequency of occurrence of phase discontinuities induced by pointer justifications may represent a very low frequency difficult to filter in the phase-locked loop of the desynchronizer. The idea of the invention is that, in place of the pointer suppression at the "baseband" like in the bit leaking technique, the pointer jitter frequencies are modulated to a higher frequency so that they will be filtered off in the phase-locked loop. In the signal processing according to the invention, the data is in the form of 8-bit parallel bytes inherent to the SDH and also used elsewhere in the desynchronizer. The byte-by-byte integration or suppression of phase discontinuities over a longer period of time enables a simple CMOS logic implementation at 140 Mbit/s and even higher rates, or even a common data buffer with the phase-locked loop.

In the preferred embodiment of the invention, the modulation comprises the shifting of the phase of the read clock derived from the input signal of the desynchronizer in 8-bit steps in one direction, e.g. at a frequency f1 substantially higher than the effective bandwidth of the phase-locked loop, and in the opposite direction at a frequency f1±df, where df is a parameter varying according to the occurrence of the pointer justifications. The parameter df is zero when no pointer justifications occur, and a positive or negative increment is added to the parameter df for a predetermined period of time in response to each positive or negative pointer justification, respectively.

The invention also relates to desynchronizers useful for practicing the method.

BRIEF DESCRIPTION OF THE DRAWINGS

The invention will be described more closely in the following by means of illustrating embodiments with reference to the attached figures, in which.

DETAILED DESCRIPTION PREFERRED EMBODIMENTS OF THE INVENTION

In the following the invention will be described in connection with signals complying with the synchronous digital hierarchy SDH defined in the CCITT recommendations G.707, G.708 and G.709, but it can also be applied to other similar digital signals employing the justification technique, such as the synchronous optical network SONET.

Figure 1:
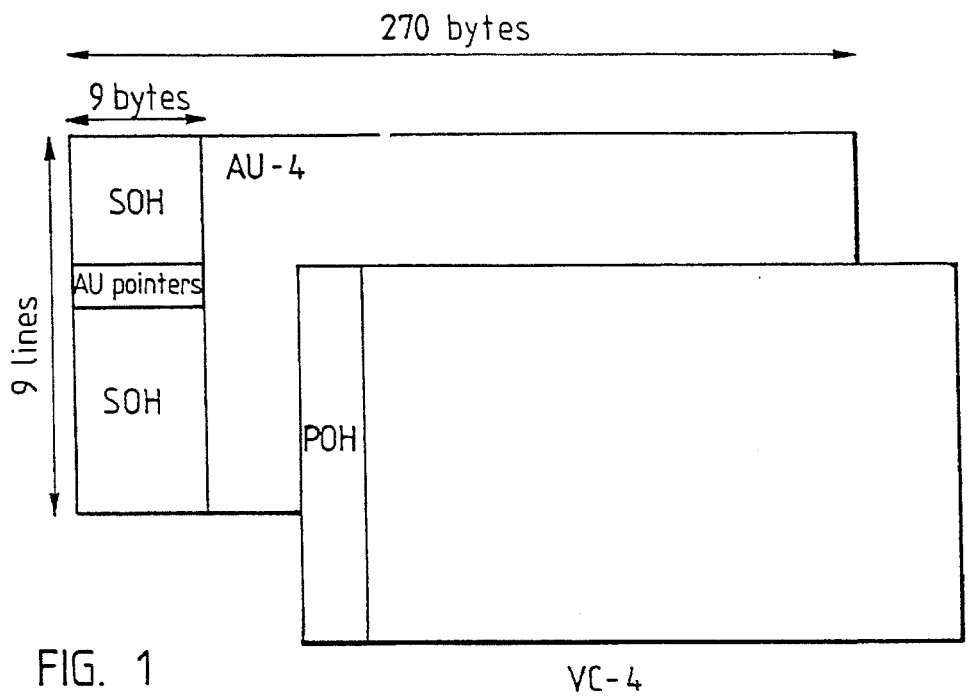
FIG. 1 illustrates the transfer frame STM-1 of the SDH system.

The frame structure STM-1 of the SDH system, the framing and the pointer and bit justifications were described above with reference to FIG. 1. In addition, the above-mentioned CCITT recommendations, the above-mentioned article by Ralph Urbansky, and the patent applications FI-914746 and AU-B-34639/89 are referred to. The SONET system is described, e.g. in *To Know Your Sonet, Know Your VTs* by Stephen Fleming, TE&M, Jun. 15, 1989, p. 62 to 75.

Figure 4:
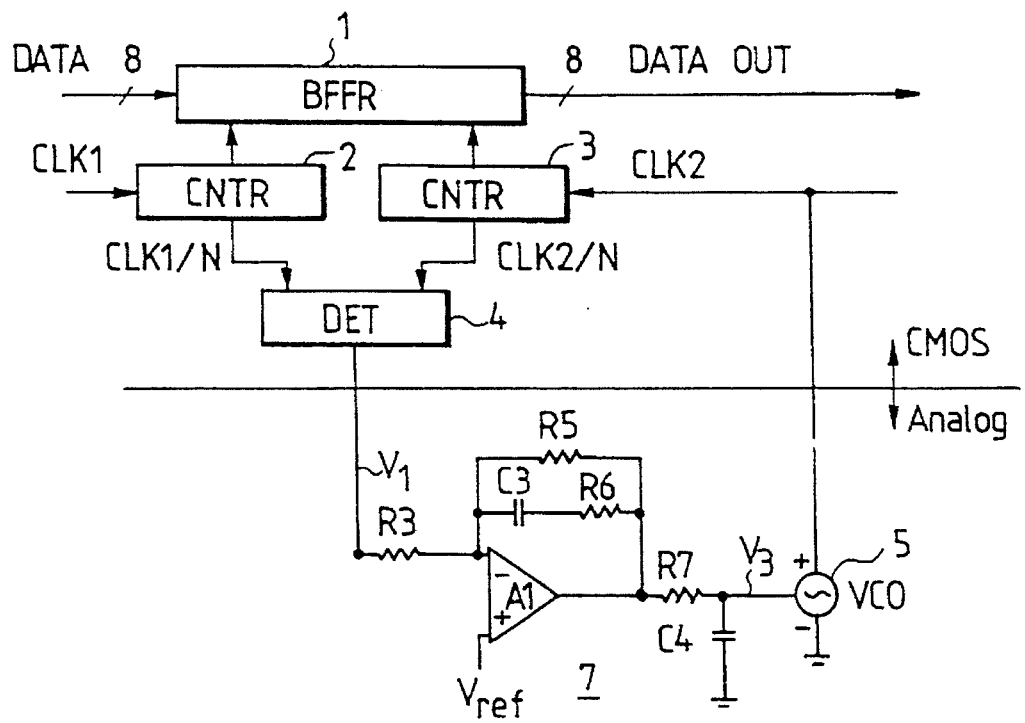
FIG. 4 is a block diagram illustrating a typical desynchronizer without pointer jitter suppression.

FIG. 4 shows a prior art desynchronizer. A digital synchronous signal DATA, such as an SDH signal consisting of STM-1 frames, is received at the input of a buffer memory 1, from where it is written in parallel form byte by byte in accordance with addresses generated by a write address counter 2 to the buffer memory 1, and further read byte by byte in accordance with addresses generated by a read address counter 3 in parallel form, byte by byte, out of the buffer 1 so that a digital output signal DATA OUT with a desired transmission rate, e.g. 140 Mbit/s, is obtained from the desynchronizer. The write address counter 2 generates write addresses in synchronization with a write clock CLK1. Correspondingly, the read address counter 3 generates read addresses in synchronization with a read clock CLK2. The read clock CLK2 is phase-locked to the write clock CLK1 by a phase-locked loop (PLL) comprising a phase detector, a lowpass filter and a voltage-controlled oscillator. Signals CLK1/N and CLK2/N derived from the write and read clocks by dividing are applied to the phase detector 4 from the counters 2 and 3, where N is a divisor dimensioned in accordance with the length of the buffer and the active range of the phase detector. The phase detector 4 produces a voltage signal V1 proportional to the phase difference between the signals CLK1/N and CLK2/N, and this voltage signal is applied through a resistor R3 to an operational amplifier A1. The operational amplifier A1 with associated resistors R3, R5, R6, R7, C3 and condenser C4 forms a loop filter which determines the loop gain of the phase-locked loop. The loop gain is selected so that an appropriate bandwidth is obtained. The operational amplifier A1 generates a control voltage $V_3$ applied to the control input of the voltage-controlled oscillator 5 so as to determine the frequency of the read clock CLK2 generated by the oscillator 5. The phase-locked loop tends to adjust the frequency of the read clock CLK2 so that the phase difference between the clocks CLK1 and CLK2 is sufficiently small. A desynchronizer circuit of this type and different variations thereof are well-known to one skilled in the art.

Figure 2:
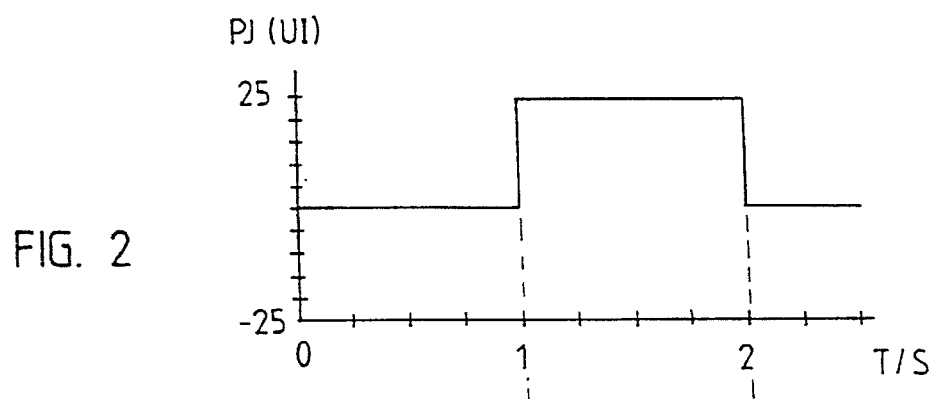
FIGS. 2 and 3 illustrate a phase discontinuity occurring in the input of a prior art desynchronizer and phase jitter present in the output, respectively, when the transmission rate is 140 Mbit/s and the bandwidth of the phase-locked loop is about 2 Hz.
Figure 3:
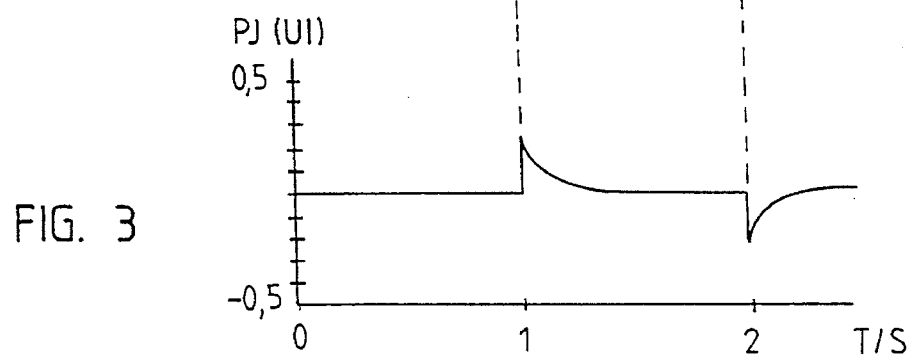

The PLL of the desynchronizer shown in FIG. 4, however, is not as such able to sufficiently suppress phase discontinuities, called pointer justifications herein, induced by the pointer justifications occurring in the incoming digital signal DATA. As mentioned above in connection with FIGS. 2 and 3, the pointer jitter in the output DATA OUT of the desynchronizer can be suppressed satisfactorily by limiting the bandwidth of the PLL but the speed and reliability of the locking of the PLL are deteriorated at the same time.

In the invention, this problem is solved by modulating the phase jitter caused by the pointer justifications occurring in the input signal DATA of the desynchronizer from its normal frequency of occurrence to a higher frequency which is substantially higher than the bandwidth of the phase-locked loop of the desynchronizer, and so the phase-locked loop is able to efficiently suppress the pointer phase jitter in the output signal DATA OUT of the desynchronizer.

Figure 5:
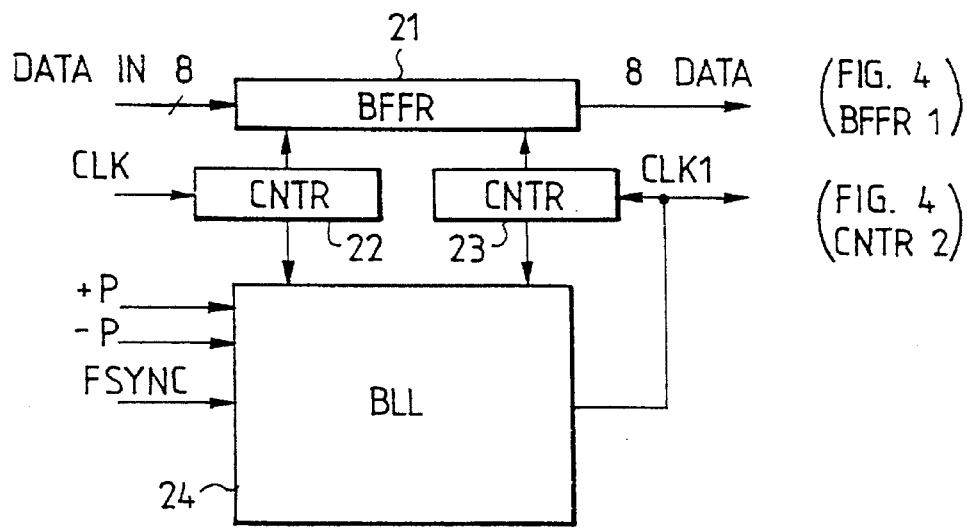
FIG. 5 is a block diagram illustrating a pointer jitter suppression circuit according to the invention.

FIG. 5 shows a byte-by-byte phase discontinuity suppression circuit (byte leaking) according to the preferred embodiment of the invention, which, when connected in series before the desynchronizer shown in FIG. 4, forms a desynchronizer operating in accordance with the invention. Generally speaking, the purpose of the suppression circuit of FIG. 5 is to advance or retard the phase of the digital signal DATA and the clock CLK1 applied to the desynchronizer of FIG. 4 in response to the occurrence of the pointer justifications so that the maximum amplitude of the pointer phase jitter in the output signal DATA OUT of the desynchronizer of FIG. 4 will be suppressed.

In FIG. 5, a digital synchronous signal DATA IN, such as an SDH signal consisting of STM-1 frames, is received at the input of a buffer memory 21 (from now on called an auxiliary buffer), from where it is written in parallel form, byte by byte, in accordance with addresses generated by a write address counter 22 to the auxiliary buffer 21 and further read in accordance with read addresses generated by a read address counter 23 in parallel form byte by byte from the auxiliary buffer 21, thus obtaining a digital signal DATA applied to the input of the data buffer 1 (FIG. 4) cascaded with the buffer 21. The write address counter 22 generates write addresses in synchronization with a write clock CLK and, correspondingly, the read address counter 23 generates read addresses in synchronization with a read clock CLK1.

The circuit of FIG. 5 further comprises a control logic which receives at its inputs a write address from the counter 22, a read address from the counter 23 and a frame synchronizing address FSYNC, a positive pointer justification detection signal +P and a negative pointer justification detection signal −P from the digital section of the desynchronizer. As is well-known in the art, the desynchronizer produces signals indicating the time of occurrence and direction of each pointer justification for internal use, and these signals can be utilized in the implementation of the present invention. The signals applied to the control circuit 24 are the same as those used in typical bit leaking implementations. The output signal of the control logic 24 is the read clock CLK1, which controls the read address counter 23 and the read address counter 2 shown in FIG. 4.

The control logic 24 shifts the phase of the read clock CLK1, e.g. advances the phase, substantially at uniform intervals at a predetermined frequency f1, and performs opposite phase shifts, e.g. retards the phase, substantially at uniform intervals at another frequency f1±df. In this way "artificial" phase discontinuities are produced in the signal DATA at the frequency f1, which are filtered off in the phase-locked loop of the desynchronizer when f1 is substantially higher than the bandwidth of the phase-locked loop.

As the parameter df is variable in response to the occurrence of pointer justifications, the frequency of occurrence of artificial opposite pointer phase justifications effected can be adjusted by the actual pointer justifications, and so the baseband phase jitter caused by the actual pointer justifications can be shifted to the frequency f1. In the preferred embodiment of the invention, the control means 24 adjusts the parameter df in accordance with the occurrences of the pointer justifications indicated by the signals +P and −P in the following way: the control logic 24 resets the parameter df when no pointer justifications occur. Thereby, artificial phase shifts occur in the clock signal CLK1 at the same frequency f1 both onwards and backwards. When a positive pointer justification occurs in the signal DATA IN, the control logic 24 adds a positive increment to the parameter df for a predetermined period of time, as a result of which the artificial backward phase shifts of the signal CLK1 take place at a frequency slightly higher than the frequency of the onward phase shifts. Correspondingly, the control logic 24 adds a negative increment to the parameter df for a predetermined period of time, i.e. decreases its value, as a result of each negative pointer justification occurring in the signal DATA IN.

In the invention the bandwidth of the phase-locked loop at 140 Mbit/s is e.g. 20 Hz and the frequency f1 is, e.g., about 1 kHz.

The phase locked loop may, of course, also be a digital phase locked loop with a digital loop filter.

For the sake of clarity, the byte-leaking technique described in this specific example utilizes a dedicated elastic buffer. Naturally, the invention can also be integrated in a prior art desynchronizer so that a single common elastic buffer with the associated drivers is needed.

Figure 6:
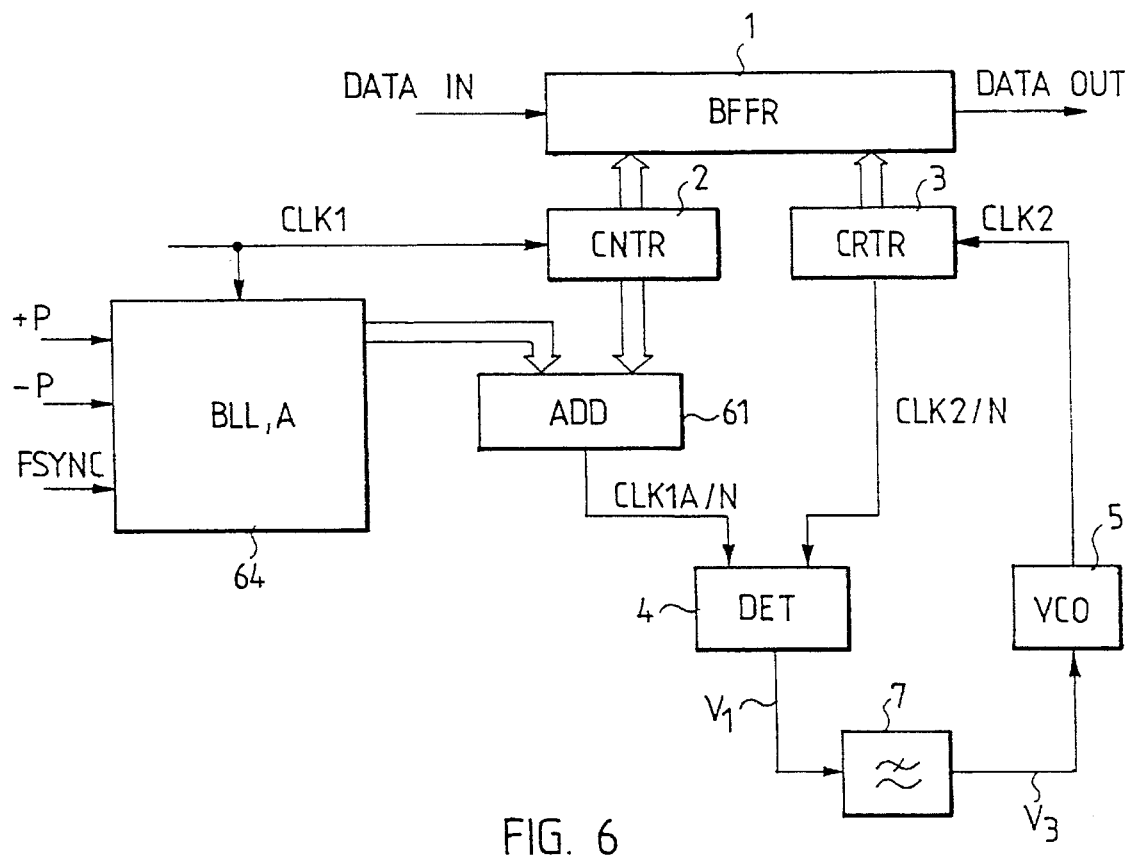
FIG. 6 is a block diagram illustrating another pointer jitter suppression circuit according to the invention as applied to the desynchronizer shown in FIG. 4.

FIG. 6 also shows a byte-leaking circuit according to the invention, which utilizes the same buffer 1 as a desynchronizer of the type shown in FIG. 4. In this way the separate pointer buffer 21 shown in FIG. 5 can be omitted. The circuit of FIG. 6 comprises a parallel subtractor 61 which receives the count (write address) from the write address counter 2 and subtracts it from an offset count D1 present at its second input and applies the difference CLK1A/N to the phase comparator 4. Otherwise the phase-locked loop is similar to that shown in FIG. 4. The circuit in FIG. 6 further comprises a control logic 64 which receives the signals +P, −P and FSYNC and the write clock CLK1 at its inputs and performs artificial phase shifts at the frequencies f1 and f1+df, as described in connection with FIG. 5. In addition, the control logic 64 generates a signal D1 which, at intervals of 1/(f±df), gets a difference value corresponding to the pointer justification. The difference value is subtracted from the write address CLK1/N in the subtractor circuit 61. At other time instants, the value of the signal D1 is 0. The value of the parameter df is again dependent on the occurrence of the pointer justifications, and it is adjusted similarly as in the embodiment of the FIG. 5. In this way, the phase jitter will be converted from the baseband frequency to the frequency f1.

Figure 7:
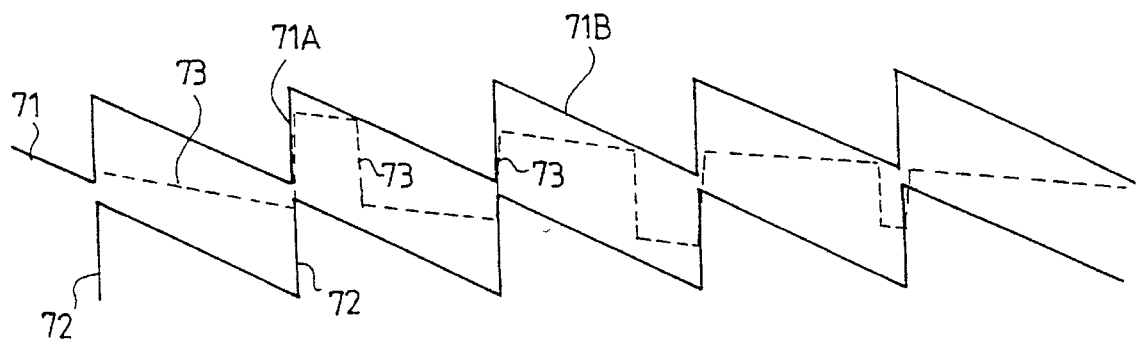
FIG. 7 is a signal diagram illustrating threshold modulation.

In the circuits of FIGS. 5 and 6, the control logic 24 and 64, respectively, may generate phase discontinuities, e.g. by threshold modulation, which is illustrated in FIG. 7. The unbroken lines 71 and 72 represent upper and lower thresholds, respectively, which change in a saw-tooth-like manner as a function of time and the values of which continuously differ from each other in an amount corresponding to the signal amplitude of the phase signal 73. The upward transitions 71A and 72A of the saw-tooth wave signals 71 and 72, respectively, take place at the frequency f1. When the slightly sliding phase signal 73 reaches the upper threshold, a downward (backward) phase shift is performed, and when it reaches the lower threshold, an upward (onward) phase shift is performed. In this specific example, the upward phase shifts 73A always fall within the steep transitions 72A of the saw-tooth wave, thus occurring at the constant frequency f1. The downward phase shifts 73B of the phase signal 73 take place at a point which slides onwards along the back slope of the saw-tooth wave 71 at the frequency f1−df. Finally, in accordance with the invention, artificial phase shifts occurring at the frequencies f1 and f1±df will be obtained.

The justification frequency in bit justification may represent the worst possible jitter frequency passing through the phase-locked loop, but as the duration of the phase discontinuities in bit justification is only one time interval, the low phase jitter induced by them has been insignificant as compared with the pointer jitter. In the compensation circuit according to the invention, the pointer jitter is suppressed, and so the jitter caused by bit justification may also become problematic. The circuits of FIGS. 5 and 6 may also be used for compensating the jitter induced by bit justification concurrently with the compensation of the pointer jitter. The parameter df thereby also depends on the occurrence of bit justifications, and whenever a bit justification takes place, an increment is added to the parameter df for a period of time which is e.g. 1/8 or 1/24 of the corresponding period of time of the increment induced by an 8-bit or 24-bit pointer justification.

On the basis of the above description, the different practical implementations and modifications for realizing the pointer jitter modulation according to the invention are obvious to one skilled in the art. The figures and the description related to them are only intended to illustrate the present invention. In its details the method and desynchronizers according to the invention may vary within the spirit and scope of the attached claims.

I claim:

1. A method for suppressing pointer phase jitter in a desynchronizer, said method comprising the steps of:

receiving a digital synchronous signal at an input of the desynchronizer;

generating buffer write addresses under control of a write clock;

writing said digital synchronous signal to a buffer in accordance with said buffer write addresses;

generating buffer read addresses under control of a read clock;

reading said synchronous digital signal from said buffer in accordance with said buffer read addresses;

phase-locking the read clock to the write clock by a phase-locked loop; and modulating a phase jitter induced by pointer justifications occurring in said digital synchronous signal at the input of the desynchronizer to a frequency substantially higher than the bandwidth of the phase-locked loop.

2. The method according to claim 1, wherein:

said step of modulating comprises step of shifting the phase of the read clock derived from said digital synchronous signal at the input of the desynchronizer byte by byte in one direction at a frequency f1 substantially higher than the bandwidth of the phase-locked loop, and in an opposite direction at a frequency f1±df, where df is a parameter varying according to the occurrence of the pointer justifications.

3. The method according to claim 1, wherein:

said step of modulating comprises threshold modulation.

4. The method according to claim 2, wherein:

the parameter df is zero when no pointer justifications occur; and further comprising the step of adding a positive or negative increment to the parameter df for a predetermined period of time as a result of each positive or negative pointer justification, respectively.

5. A desynchronizer comprising:

a pointer buffer means and a data buffer means in a cascade;

a pointer buffer write address counter controlled by a first write clock;

a pointer buffer read address counter controlled by a first read clock;

a data buffer write address counter controlled by said first read clock; a data buffer read address counter controlled by a second read clock;

a phase-locked loop for locking said second read clock to the first read clock; and phase shifting means for advancing and retarding the phase of the first read clock in response to an occurrence of the pointer justification so as to suppress a pointer jitter, the phase of the first read clock being shifted by the phase shifting means in a first direction substantially at uniform intervals at a first frequency f1 and in an opposite direction at uniform intervals at a first frequency f1±df, where df is a parameter varying according to the occurrence of the pointer justifications.

6. The desynchronizer according to claim 5, wherein:

the phase shifting means is responsive to the occurrence of the pointer justifications, resetting the parameter df when no pointer justifications occur, and adding a positive or negative increment to the parameter df for a predetermined period of time as a result of each positive or negative pointer justification, respectively.

7. A desynchronizer comprising:

a data buffer means;

a data buffer write address counter controlled by a write clock;

a data buffer read address counter controlled by a read clock; and a phase-locked loop comprising:
   - a phase comparator means comparing the readings of the read and write counters;
   - a loop filtering means; and
   - a voltage-controlled oscillator means, for locking the read clock to the write clock;

means for subtracting a difference value from the write address of the write counter at a frequency f1±df substantially higher than the bandwidth of the phase-locked loop, and for applying a resulting address to the phase comparator means, where f1 is a predetermined frequency and df is a parameter varying according to the occurrence of the pointer justifications.

8. The desynchronizer according to claim 7, wherein:

said means for subtracting are responsive to the occurrence of the pointer justifications, resetting the parameter df when no pointer justifications occur, and adding a positive or negative increment to the parameter df for a predetermined period of time as a result of each positive or negative pointer justification.

* * * * *